July 14, 1953 A. R. McKINSTRY 2,644,980
SHRIMP DEVEINER AND SPLITTER
Filed June 23, 1950 7 Sheets-Sheet 1

INVENTOR.
Alston R. McKinstry
BY Victor J. Evans & Co.
ATTORNEYS

July 14, 1953 A. R. McKINSTRY 2,644,980
SHRIMP DEVEINER AND SPLITTER
Filed June 23, 1950 7 Sheets-Sheet 3

INVENTOR.
Alston R. McKinstry
BY Victor J. Evans & Co.
ATTORNEYS

July 14, 1953 — A. R. McKINSTRY — 2,644,980
SHRIMP DEVEINER AND SPLITTER
Filed June 23, 1950 — 7 Sheets-Sheet 4

INVENTOR.
Alston R. McKinstry
BY Victor J. Evans & Co.
ATTORNEYS

July 14, 1953

A. R. McKINSTRY 2,644,980

SHRIMP DEVEINER AND SPLITTER

Filed June 23, 1950

INVENTOR.
Alston R. McKinstry
BY Victor J. Evans & Co.
ATTORNEYS

July 14, 1953  A. R. McKINSTRY  2,644,980
SHRIMP DEVEINER AND SPLITTER
Filed June 23, 1950  7 Sheets-Sheet 6

INVENTOR.
Alston R. McKinstry
BY Victor J. Evans & Co.
ATTORNEYS

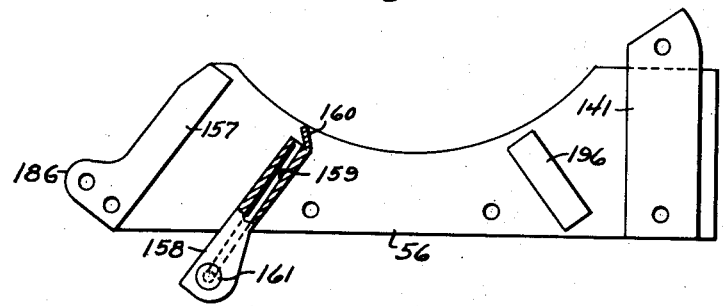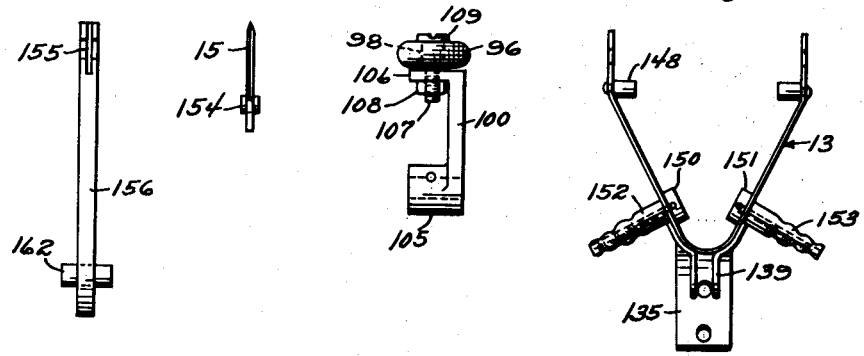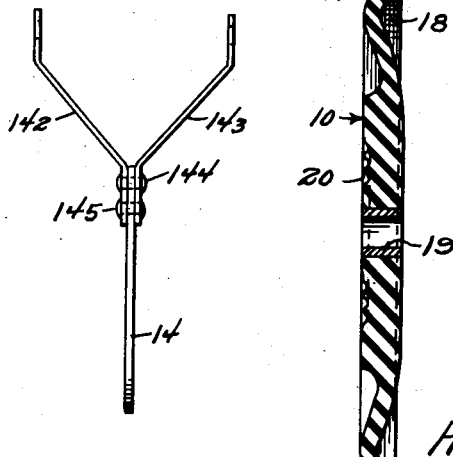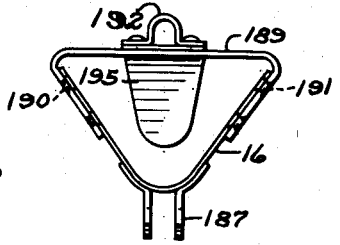

Patented July 14, 1953

UNITED STATES PATENT OFFICE 2,644,980

SHRIMP DEVEINER AND SPLITTER

Alston R. McKinstry, Brunswick, Ga., assignor, by direct and mesne assignments, to Seafood Equipment Corporation, Glynn County, Ga., a corporation of Georgia Application June 23, 1950, Serial No. 169,808

8 Claims. (Cl. 17—2)

This invention relates to machines for preparing shrimp for the market, and in particular a machine having means for positioning shrimp for a deveining cutter in which shrimp are propelled by water jets through the positioning means to conveying means positioned to receive the shrimp from the positioning means and in which the conveying means is designed to carry the shrimp over the deveining cutter with the shrimp held in deveining position and also for holding and carrying the shrimp over a cutting knife. The machine is also provided with ejecting means for removing the shrimp from the conveying means whereby the shrimp are deposited into a discharge chute.

The purpose of this invention is to provide a shrimp deveining machine in which shrimp drop into a feeding chute and immediately assume the correct position for accurate cutting and are automatically conveyed over a deveining cutter and cleaning knife and in which the shrimp are propelled and cleaned by jets of water.

Various types of shrimp deveining machines have been provided where the shrimp are held by hand in the deveining and cutting operation but the capacity of machines of this type is limited. With this thought in mind this invention contemplates a deveining machine into which shrimp may be dropped from a grading machine or the like and in which the shrimp are automatically positioned and conveyed over a deveining cutter, washed and cleaned, and ejected with the sand and vein channel cleaned.

The object of this invention is, therefore, to provide a shrimp deveining machine in which means is provided for positioning and deveining shrimp whereby the machine conveys the shrimp over a deveining cutter with the shrimp accurately positioned and in which the shrimp are also conveyed over water jets whereby the shrimp are deveined and cleaned.

Another object of the invention is to provide a shrimp deveining machine in which the shrimp are conveyed by flexible elements whereby the conveying elements are readily adjustable to shrimp of different sizes.

Another object of the invention is to provide a shrimp deveining machine in which the shrimp are accurately positioned so that only a small deveining channel is formed therein, and wherein the depth of the channel is adjustable.

A further object of the invention is to provide a shrimp deveining machine which is of a comparatively simple and economical construction.

With these and other objects and advantages in view the invention embodies a machine having a pair of angularly disposed flexible discs with annular concave channels in the inner surfaces and spaced from the outer edges thereof, resilient means urging the outer edges of the discs in shrimp gripping positions, a V-shaped chute positioning and feeding shrimp to the discs, a rotary knife mounted between guide plates and extending into the concave channel between the meeting surfaces of the discs for cutting through the shell of the shrimp positioned in the channel and into the vein of the shrimp, and a shrimp removing finger extending into the channel between the discs for directing the deveined shrimp into a discharge chute.

Other features and advantages of the invention will appear from the following description taken in connection with the drawings wherein:

Figure 8 is a detail illustrating one of the guides positioned at the sides of the deveining cutter illustrating the mounting elements thereon and with parts shown in section and parts omitted.

Figure 9 is an end elevational view showing the knife blade holder with the knife and other parts removed.

Figure 10 is a detail showing an edge view of the knife.

Figure 11 is a detail showing one of the small rubber rollers positioned against the sides of the flexible discs for yieldingly forming the discs to compensate for shrimp of different sizes.

Figure 12 is a detail illustrating a yoke in which a shrimp centering rod is positioned.

Figure 13 is a detail illustrating the shrimp centering rod that is carried by the yoke shown in Figure 12.

Figure 14 is a diametric cross section through one of the flexible discs.

Figure 15 is an end elevational view of the discharge chute.

Figure 1:
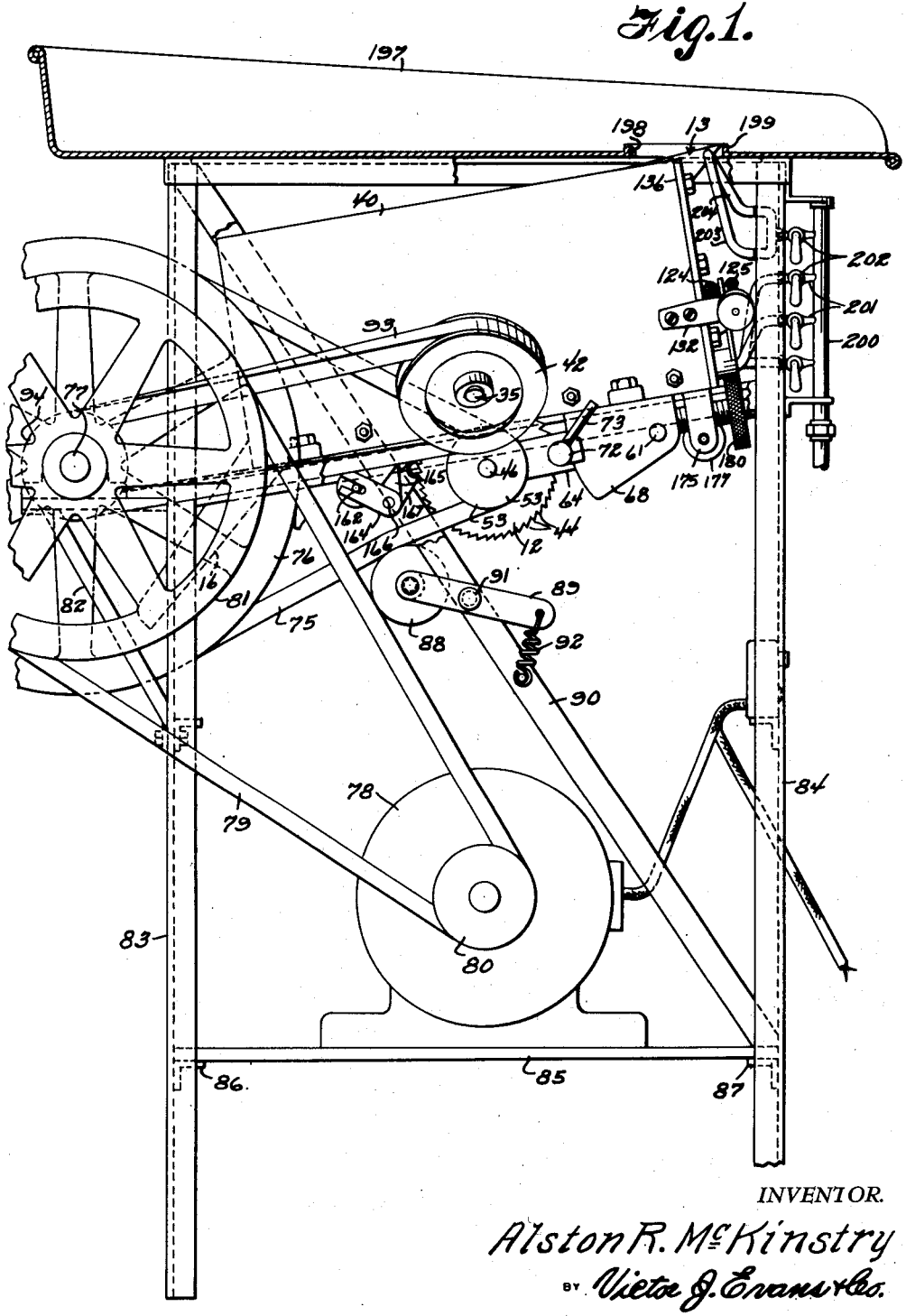
Figure 1 is a side elevational view of the deveining machine with a shrimp receiving hopper on the upper end of the machine shown in section.
Figure 2:
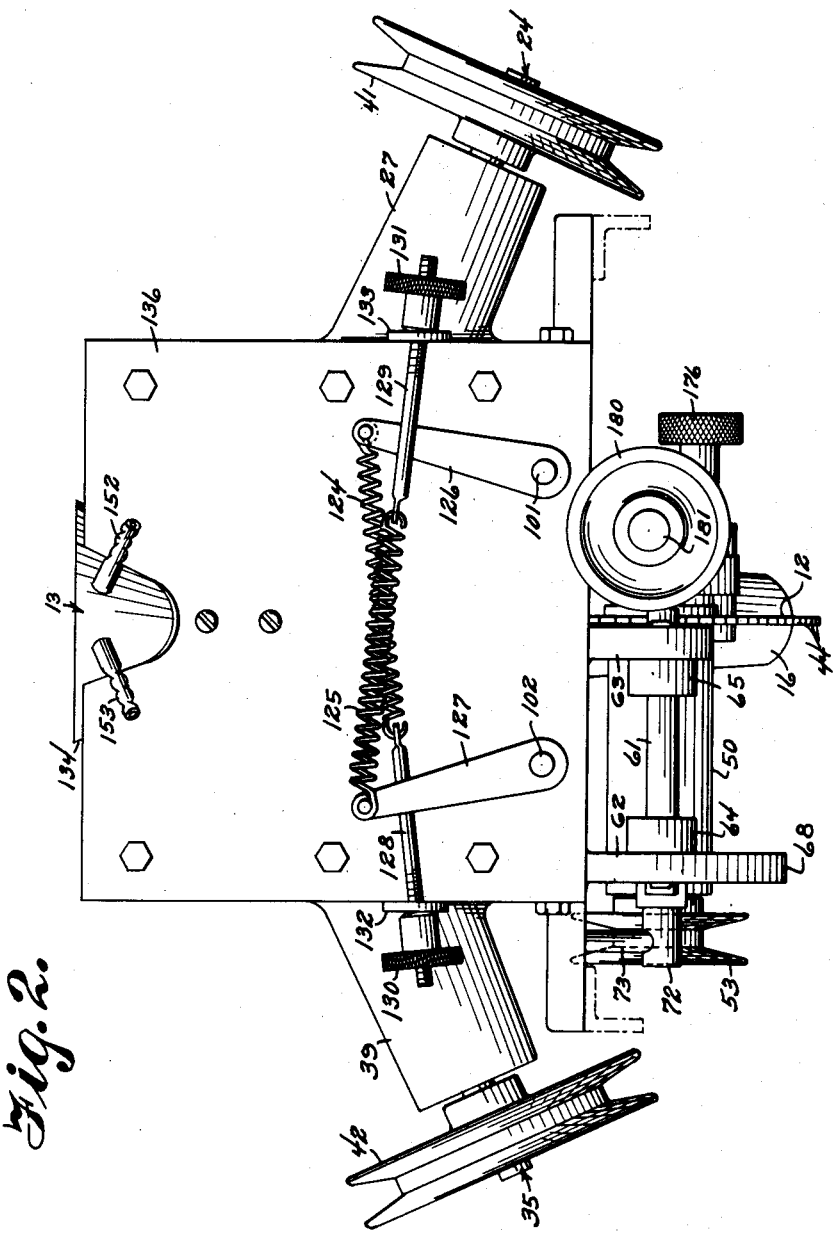
Figure 2 is an end elevational view on enlarged scale of the shrimp deveining element of the machine with the frame omitted and looking toward the end of the machine from which the shrimp are fed to the deveining means.
Figure 3:
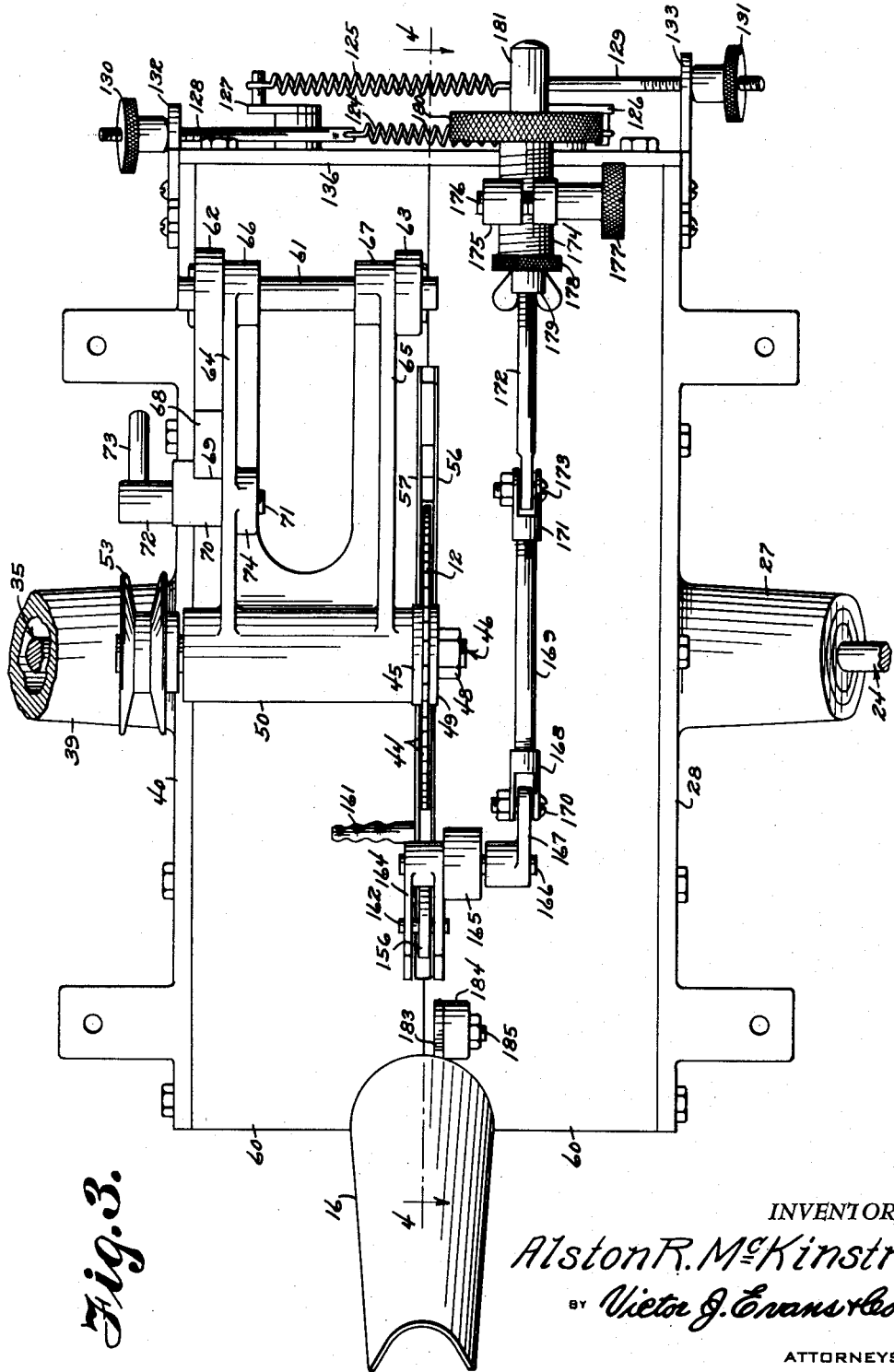
Figure 3 is a view on enlarged scale looking upwardly toward the under surface of the deveining element of the machine showing the rotary deveining cutter and the operating instrumentalities of the cutter and knife.

Referring now to the drawings wherein like reference characters denote corresponding parts the improved shrimp deveining machine of this invention includes a pair of flexible discs 10 and 11, a deveining cutter 12 positioned with the upper edge extended between the discs, a positioning chute 13, a shrimp centering rod 14, a knife-like finger 15, and a discharge chute 16.

Figure 5:
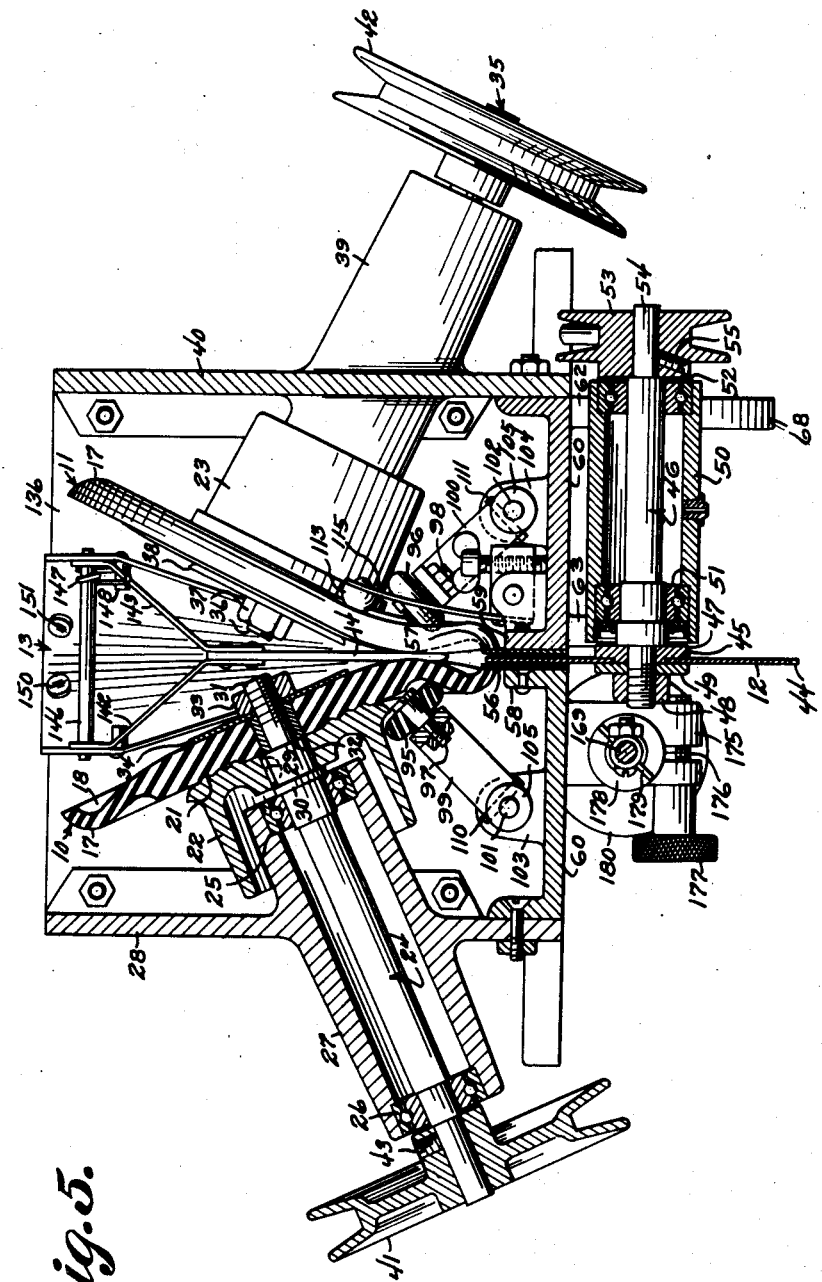
Figure 5 is a cross section through the machine taken on line 5—5 of Figure 4 showing the flexible shrimp conveying discs with the discs and mounting elements therefor and one side of the machine shown in elevation.
Figure 6:
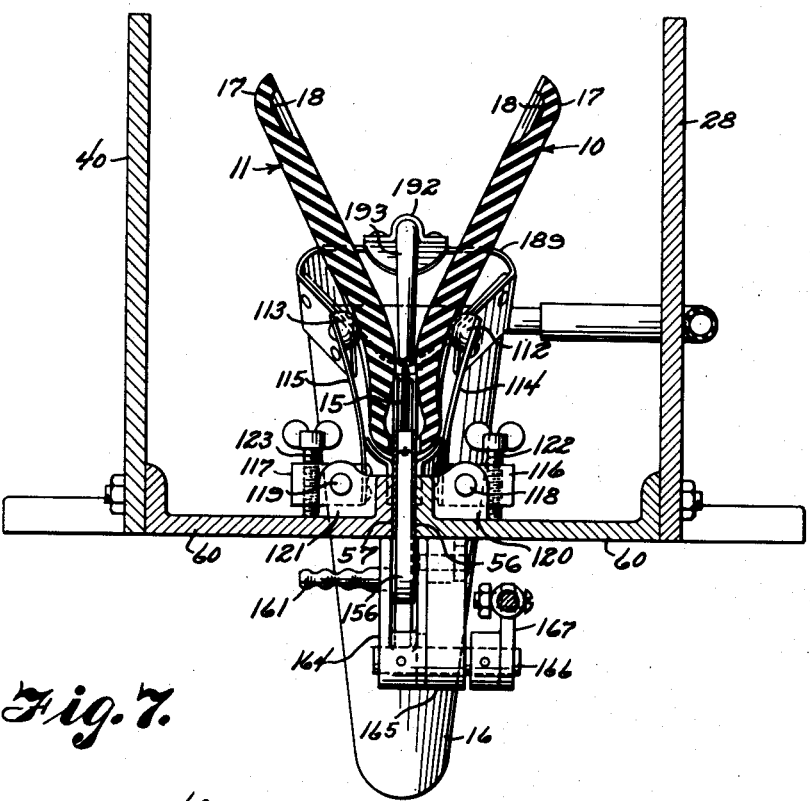
Figure 6 is a similar section taken on line 6—6 of Figure 4 also showing the flexible discs and illustrating the knife extended between the discs.
Figure 7:
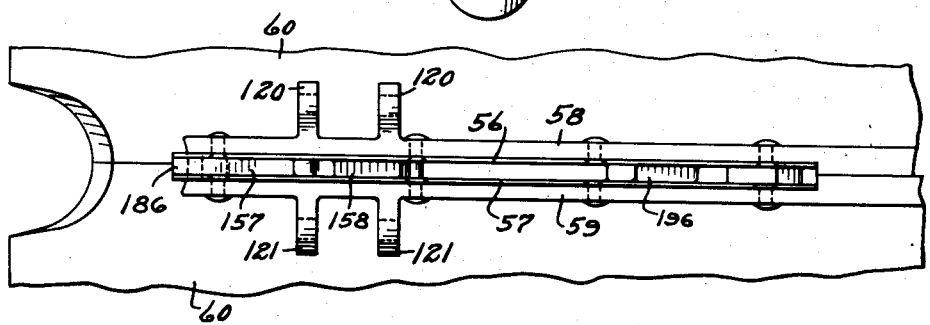
Figure 7 is a sectional plan through the housing of the deveining machine showing the deveining cutter and knife slot through the lower end thereof.

The shrimp conveying discs 10 and 11 are formed of rubber or other suitable resilient material and, as illustrated in Figure 14 these discs are formed with arcuate peripheral edges 17 forming a concave annular recess 18 in the inner surface and, as illustrated in Figures 5 and 6 the recess 18 is positioned to receive, hold, and convey shrimp over the cutter 12. The discs are provided with mounting bushings 19 and the intermediate areas of the outer surfaces are provided with corrugations 20 that receive corresponding corrugations 21 on the ends of hubs 22 and 23 against which the discs are mounted.

The disc 10 is mounted on a shaft 24 that is journaled by bearings 25 and 26 in a hub 27 and the hub is mounted in a side wall 28 of the boxlike housing in which the deveining elements are positioned. The hub 22 is keyed to the end of the shaft 24 by a key 29 with the hub positioned against a collar 30 and the disc 10 is mounted through the bushing 19 on a threaded stud 31 at the end of the shaft 24 with the disc clamped against a shoulder 32 by a nut 33 and with a washer 34 under the nut.

The disc 11 is mounted on a similar shaft 35 with the disc positioned on a stud 36 and held by a nut 37 with a washer 38. The shaft 35 is mounted in a hub 39 similar to the hub 27 and the hub is positioned in a side wall 40 of the housing. Pulleys 41 and 42 are mounted on the outer ends of the shafts 24 and 35, respectively, and the pulleys are secured in position by set screws 43.

The deveining cutter 12, which may be in the form of a circular saw and is here shown as having teeth 44 in the peripheral edge is mounted on a hub 45 on a shaft 46 with the cutter clamped in a recess 47 by a nut 48 with a washer 49 and the shaft is journaled in a hub 50 with bearings 51 and 52. The outer end of the shaft is provided with a pulley 53 that is secured on a stud 54 at the end thereof by a set screw 55.

The cutter 12 extends upwardly through guide plates 56 and 57, as shown in detail in Figure 8 and the guide plates are mounted between flanges 58 and 59 of a base plate 60 forming the bottom of the housing. With the parts formed in this manner the guide plates 56 and 57 hold the lower edges of the discs 10 and 11 separated, as illustrated in Figure 5 and the cutter 12 extends upwardly through the plate where it is positioned to engage shrimp held between the discs.

The hub 50 in which the shaft 46 upon which the rotary cutter 12 is journaled is pivotally mounted by shafts 61 in bearings 62 and 63 on the under surface of the base plate 60 through arms 64 and 65 with hubs 66 and 67, respectively positioned on the shaft 61. The bearing 62 is provided with an arcuate cam surface 68 that extends through a slot 69 in the hub 70 and the hub 70 clamps the arms 64 and 65, which supports the cutter 12, in selected adjusted positions by means of the clamp screw 71 having a head 72 with a handle 73 extended therefrom. The clamp screw extends through the hub 70 and is threaded into a boss 74 on the arm 64.

The shaft 46 of the deveining cutter 12 is driven by a belt 75 which is trained over the pulley 53 and also over a pulley 76 on a shaft 77 which is driven from a motor 78 by a belt 79 that is trained over pulleys 80 and 81, as shown in Figure 1. The shaft 77 is journaled in brackets 82 mounted on the end members 83 of a supporting frame having corresponding end members 84 at the opposite side and the motor is positioned on a platform 85 supported between the end members by angles 86 and 87.

The belt 75 is held in tension by an idler 88 carried in the end of an arm 89, the arm being pivotally mounted on a diagonal strut 90 of the frame by a pin 91 and resiliently held by a spring 92.

The flexible discs 10 and 11 are also rotated from the shaft 77 with belts 93 trained over pulleys 94 on the shaft 77 and also over the pulleys 41 and 42 on the shafts 24 and 35, respectively.

The flexible discs 10 and 11 are retained in the deformed position, as illustrated in Figure 5 by rollers 95 and 96, of resilient material, the rollers being journaled on stub shafts 97 and 98 in the outer ends of arms 99 and 100 and the arms being journaled on shafts 101, and 102, respectively which are held in ears 103 and 104. The arms 99 and 100 are shown in detail in Figure 11 wherein the arm 100 is illustrated and each arm is provided with a hub 105 at one end and a flange 106 at the other with the stub shafts 97 and 98 mounted in the flanges 106 by threaded studs 107 and nuts 108. The outer ends of the stub shafts are provided with heads 109. These rollers 95 and 96 bear against the outer surfaces of the concave areas of the flexible discs, as illustrated in Figure 5 whereby the discs are urged inwardly at points spaced from the peripheries so that shrimp may be positively secured therebetween. The arm 99 is retained in position on the shaft 101 by a pin 110 and the arm 100 is secured in position on the shaft 102 by a pin 111.

The flexible discs are also urged inwardly by resilient knobs 112 and 113 which are carried by the upper ends of springs 114 and 115, respectively and the springs are carried by blocks 116 and 117 and are pivotally mounted on pins 118 and 119 between ears 120 and 121, respectively and the blocks are held in adjusted positions by thumb screws 122 and 123, as shown in Figure 6. By these elements the walls of the discs are urged inwardly to firmly grip the shrimp as the shrimp pass over the rotary cutter 12.

The rollers 95 and 96 are actuated by springs 124 and 125 positioned at the end of the housing with the springs connected to the ends of arms 126 and 127, respectively and to adjusting screws 128 and 129, the outer ends of which are provided with thumb nuts 130 and 131, respectively, and the nuts are positioned against the plates 132 and 133 through which the screws 128 and 129 extend. By this means the tension on the rollers 95 and 96 is adjustable.

The shrimp are fed to the machine through the positioning chute 13, the upper edge of which is provided with a flange 134 that is mounted on the upper end of the housing and the chute is held in position by a bracket 135 which is mounted on the end wall 136 by screws 137 and 138, and a projection 139 that is connected by a pin 140 in bars 141 on the ends of the guide plates 56 and 57.

The centering rod 14 is suspended by outwardly diverging arms 142 and 143 to which it is attached by spaced rivets 144 and 145 and the upper ends of the arms are pivotally mounted on a rod 146 extended through side walls of the chute 13, as shown in Figure 5. A spring 147 is provided on the rod 146 and one end of the spring is positioned to engage a stop 148 on the inner surface of the chute with the opposite end 149 extended over the arm 143 of the centering rod. By this means the rod 14 is resiliently urged into engagement with the shrimp passing into the cavity between the discs from the chute 13.

The upper end of the chute 13 is provided with spray nozzles 150 and 151 and the nozzles are provided with corrugated nipples 152 and 153, respectively over which the ends of water supplying hose are positioned.

The knife-like finger member 15, as shown in detail in Figure 10, is provided with a pin 154, the ends of which are positioned in recesses 155 in the edges of a knife holder 156 which is slidably mounted between the guide plates 56 and 57 and secured in position by a spacing bar 157 and a bar 158 through which a passage 159 extends. The bar 158 is provided with an extended lip 160 at the outer end and the inner end is provided with a corrugated nipple 161 to which the end of a hose may be connected.

The knife holder 156 is provided with a pin 162, and the pin 162 is positioned in slots 163 of a fork 164 that is pivotally mounted in a bracket 165 by a shaft 166. The opposite end of the shaft is provided with an arm 167 which is pivotally connected to a yoke 168 on a rod 169 by a screw 170. A yoke 171 on the opposite end of the rod is connected to a screw 172 by a screw 173.

The screw 172 extends through a socket 174 that is provided with a threaded outer surface and that is threaded through a split bracket 175, the sections of which are clamped around the socket by a screw 176 having a thumb nut 177 on the outer end thereof. A lock washer 178 is threaded on the screw 172 and positioned against the end of the socket 174 and the washer is secured in position by a thumb nut 179. The opposite end of the socket 174 is provided with a knurled disc 180 and the outer end of the screw 172 is provided with a cap 181 that is threaded on the end of the screw and positioned in the outer end of the socket 174 where it is urged outwardly by a spring 182. By this means the position of the knife member 15 is readily adjustable and should the knife engage an obstruction it may pass beyond the periphery of the flexible discs.

A stop 183 is pivotally mounted on a projection 184 by a pin 185 and this stop is positioned to prevent the knife holder 156 moving out of the slot 163.

The spacing plate or bar 157 is provided with a projection 186 to which clips 187 are connected by a pin 188 and the clips 187 are secured to the under surface of the discharge chute 16.

Figure 4:
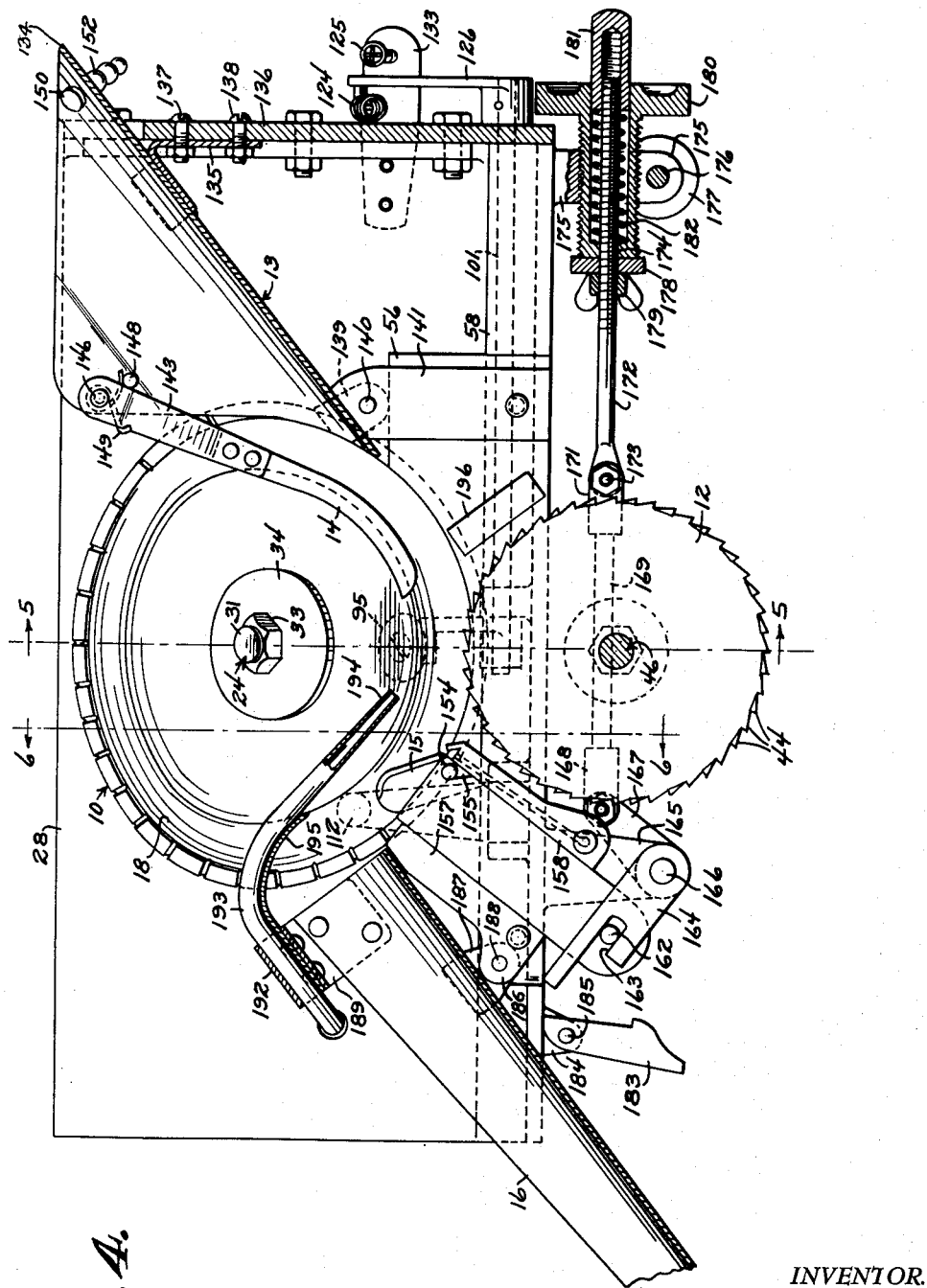
Figure 4 is a longitudinal section through the machine taken on line 4—4 of Figure 3 illustrating the relative positions of the deveining elements.

A bracket 189 extends across the upper end of the discharge chute with the ends connected to the sides of the chute by rivets 190 and 191 and the bracket is provided with a U-shape socket 192 through which a hose 193 extends as illustrated in Figure 4. With the hose secured in the socket 192 the nozzle end 194 is positioned to spray liquid on the shrimp as the shrimp are in engagement with the deveining cutter 12.

A spring finger 195 is mounted on the bracket 189, under the socket 192, as shown in Figure 4 and the tip of the finger extends between the flexible discs 10 and 11 for removing shrimp after having the shell cut and vein channel removed by the rotary cutter 12, and the cut washed by water from the nozzle 194. The shrimp are then removed by the finger-like knife member 15 and dropped into the discharge chute 16 from which they are packed and stored.

A spacing plate 196 is provided between the guide plates 56 and 57 for deflecting sands and the like cut from the vein of the shrimp downwardly.

A receiving hopper 197 is positioned upon the upper end of the frame of the machine and the hopper is provided with an opening 198 with a flange 199 extended around the opening and, as illustrated in Figure 1 the opening is positioned to receive the upper end of the positioning chute 13.

A water supply header 200 is mounted on the frame and the header is provided with a plurality of outlet connections 201 having valves 202 therein and branches from the ends of the upper valves are connected by tubes 203 and 204 to the nipples 152 and 153, respectively, with another connection provided to the nozzle 194 and another to the nipple 161 whereby water is supplied to jets distributed over the machine.

It has been established by tests that because of the circular path of movement and arcuate form of the shrimp the flexible discs accurately center the shrimp and thereby eliminate the necessity of a thick cutting blade. It has also been determined by tests that shrimp dropped into the comparatively thin chute 13 automatically assume the correct position for accurate cutting or deveining and, therefore, with the parts arranged in this manner this shrimp dropped into the chute 13 are positioned for deveining and from the chute the shrimp pass directly into the flexible discs with the centering rod 14 holding the shrimp whereby the V-shape fan tail of the shrimp engages the rod and is urged into the circular recesses or cavities of the discs, the rod also preventing the tail of the shrimp working upwardly away from the recess. The discs 10 and 11 convey the shrimp over the rotary cutter 12 by which the shell is cut and the vein channel removed. This, in combination with the water spray of the nozzle 194, removes the sand so that the cleaned shrimp are caught by the spring finger 195 and urged into the chute 16.

It will be understood that modifications may be made in the design and arrangement of the parts without departing from the spirit of the invention.

What is claimed is:

1. A machine for deveining shrimp comprising a frame structure, angular mounting means on said frame structure for a pair of opposed discs with lower sections of the peripheries of said discs in near abutting relationship and the remaining sections of the peripheries of said discs being in progressively spaced relationship with each other, said discs having annular recesses on their opposed faces, a rotary cutter mounted on said frame structure beneath said discs and extending into the area between said discs at their lower sections of near abutment, means mounted on said frame structure for feeding shrimp to the recesses of said discs, means operatively associated with said discs and cutter for rotating the same, and means mounted on said frame for removing the shrimp from said discs after the shrimp have passed over said rotary cutter.

2. A machine for deveining shrimp comprising a frame structure, angular mounting means on said frame structure for a pair of opposed rotatable flexible discs with lower sections of the peripheries of said discs in near abutting relationship and the remaining sections of the peripheries of said discs being in progressively spaced relationship with each other, said discs having annular recesses on their opposed faces adjacent the peripheries thereof, a rotary deveining cutter mounted on said frame structure beneath said discs and positioned to extend between said discs at their lower sections of near abutment and into the area provided by said recesses, means operatively associated with said discs and cutter for rotating the same, a V-shaped delivery chute mounted on said frame structure adjacent said discs and said cutter to feed shrimp to the recesses of said discs, a discharge chute mounted on said frame structure on the opposite side of said discs and said cutters, and a resilient finger extending between said discs adjacent to said discharge chute to direct shrimp from said discs to said discharge chute.

3. A machine of the type in claim 2 wherein said delivery chute is provided with means for properly positioning and conveying the shrimp therein for delivery to said discs.

4. A machine of the type in claim 3 wherein said positioning means includes a plurality of nozzles for delivering water at a high pressure and in a fine stream.

5. A machine for deveining shrimp comprising a frame structure, a pair of angularly opposed rubber discs having annular recesses on their opposed faces adjacent the outer peripheries thereof, means on said frame structure for mounting said discs so that lower sections of the peripheries of said discs are in near abutting relationship and the remaining sections of the peripheries of said discs in progressively spaced relationship with each other, a rotary cutter mounted on said frame structure beneath said discs and extending into the area between said discs at their lower sections of near abutment, a V-shaped delivery chute mounted on said frame structure above said discs to feed shrimp to said discs, a resilient guide member mounted in said chute and extending adjacent the bottom thereof, high pressure water jets mounted adjacent said chute for directing the shrimp down said chute and into the recesses of said discs, means operatively associated with said discs and cutter for rotating the same, a discharge chute mounted on said frame structure for receiving the deveined shrimp from said discs, a resilient finger mounted on said discharge chute and extending between said discs to direct the deveined shrimp to said discharge chute.

6. A machine for devening shrimp which comprises a frame structure, a pair of angularly opposed discs having annular recesses on their opposed faces adjacent the peripheries thereof, means on said frame structure for mounting said discs so that lower sections of the peripheries of said discs are in near abutting relationship and the remaining sections of the peripheries of said discs in progressively spaced relationship with each other, a rotary cutter mounted on said frame structure beneath said discs and extending into the area between said discs at their lower sections of near abutment, a V-shaped delivery chute mounted on said frame structure for delivering shrimp to the recesses of said discs, resilient rollers mounted on said frame structure and positioned to engage the outer surface of said discs in order to retain the near abutting peripheral sections of the discs in gripping relationship with shrimp carried by the recesses, means operatively associated with said rollers and resiliently urging said rollers against the surfaces of said discs, and means operatively associated with said discs for removing the shrimp from the discs after they have passed over said rotary cutter.

7. In a shrimp deveining machine, the combination comprising a frame structure, a pair of opposed rubber discs rotatably mounted on said frame structure, said discs having annular concave recesses on their opposed inner faces adjacent the peripheries thereof, said discs having their opposed faces angularly disposed relative to each other in a manner so that the lower sections of said discs are in near abutment, guide blades mounted on said frame structure and extending upwardly between said discs to prevent the lower sections thereof from having contact with each other, a rotary cutter mounted on said frame structure and extending upwardly between said guide plates and into the area between the annular recesses on the opposed faces of said discs, a V-shaped delivery chute mounted on said frame structure for delivering shrimp to said discs, a resilient finger mounted on said chute and extending adjacent the bottom thereof to maintain said shrimp in position for engagement by said discs, resilient rollers mounted on said frame structure to engage the outer surfaces of said discs, spring actuated knobs bearing against the outer surfaces of said discs to insure contact of said discs with the shrimp being processed, a discharge chute mounted on said frame structure and positioned on the discharge side of said discs and cutter, and means operatively associated with said discs for directing the shrimp from said discs to said discharge chute, and nozzles positioned in said V-shaped delivery chute to direct a stream of water under high pressure in a manner so as to deliver the shrimp from said delivery chute to said discs.

8. A machine for deveining shrimp comprising a frame structure, annular mounting means on said frame structure for a pair of opposed discs with lower sections of the peripheries of said discs in near abutting relationship and the remaining sections of the peripheries of said discs being in progressively spaced relationship with each other, a rotary cutter mounted on said frame structure beneath said discs and extending into the area between said discs at their lower sections of near abutment, means mounted on said frame structure for feeding shrimp to said discs, means operatively associated with said discs and cutter for rotating the same, and means mounted on said frame for removing the shrimp from said discs after the shrimp have passed over said rotary cutter.

ALSTON R. McKINSTRY.

References Cited in the file of this patent

UNITED STATES PATENTS

| Number | Name | Date |
|---|---|---|
| 2,034,691 | Bottker et al. | Mar. 24, 1936 |
| 2,263,696 | Grayson | Nov. 25, 1941 |
| 2,263,697 | Grayson | Nov. 25, 1941 |
| 2,293,133 | Halferty | Aug. 18, 1942 |
| 2,470,289 | Christiansen | May 17, 1949 |

FOREIGN PATENTS

| Number | Country | Date |
|---|---|---|
| 66,094 | Norway | Apr. 12, 1943 |